United States Patent
Kim

(10) Patent No.: US 11,106,533 B2
(45) Date of Patent: Aug. 31, 2021

(54) MEMORY SYSTEMS AND WRITING METHODS OF THE MEMORY SYSTEMS

(71) Applicant: SK hynix Inc., Icheon-si (KR)

(72) Inventor: Du Hyun Kim, Seoul (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/878,273

(22) Filed: May 19, 2020

(65) Prior Publication Data
US 2021/0034457 A1 Feb. 4, 2021

(30) Foreign Application Priority Data
Jul. 30, 2019 (KR) .......................... 10-2019-0092602

(51) Int. Cl.
*G06F 11/10* (2006.01)
*G06F 11/22* (2006.01)
*G06F 11/07* (2006.01)

(52) U.S. Cl.
CPC ........ *G06F 11/1068* (2013.01); *G06F 11/076* (2013.01); *G06F 11/0772* (2013.01); *G06F 11/1044* (2013.01); *G06F 11/2221* (2013.01)

(58) Field of Classification Search
CPC ............. G06F 11/1048; G06F 11/1044; G06F 11/1076; G06F 11/1068; G06F 11/076; G06F 3/0619; G11C 29/52
See application file for complete search history.

(56) References Cited

U.S. PATENT DOCUMENTS

| 2017/0024162 A1* | 1/2017 | Lim ....................... G11C 29/52 |
| 2017/0123896 A1* | 5/2017 | Baek ................... G06F 11/1044 |
| 2019/0056990 A1* | 2/2019 | Suh ....................... G06F 3/0619 |

FOREIGN PATENT DOCUMENTS

KR 1020120103276 A 9/2012

* cited by examiner

*Primary Examiner* — Shelly A Chase
(74) *Attorney, Agent, or Firm* — William Park & Associates Ltd.

(57) ABSTRACT

A memory system includes a host error correction code (ECC) encoder and a memory module. The host ECC encoder performs a host ECC encoding operation of write data to output host ECC encoded data, and the memory module includes a memory medium receiving the host ECC encoded data and a module controller controlling the memory medium. The module controller includes a parity remover and a module ECC decoder. The parity remover removes parity data from the host ECC encoded data to generate parity-removed data and performs a first write operation for writing the parity-removed data into the memory medium. The module ECC decoder performs a module ECC decoding operation of the host ECC encoded data to generate module ECC decoded data and performs a second write operation for writing the module ECC decoded data into the memory medium.

21 Claims, 8 Drawing Sheets

MEMORY SYSTEMS AND WRITING METHODS OF THE MEMORY SYSTEMS

CROSS-REFERENCE TO RELATED APPLICATIONS

The present application claims priority under 35 U.S.C. 119(a) to Korean Application No. 10-2019-0092602, filed on Jul. 30, 2019, which is herein incorporated by references in its entirety.

BACKGROUND

1. Technical Field

Various embodiments of the disclosed technology relate to memory systems and, more particularly, to memory systems and writing methods of the memory systems.

2. Related Art

In general, a path for transmitting information is called a channel. When the information is transmitted using cable communication, a transmission line through which the information is transmitted may act as the channel. When the information is transmitted using wireless communication, the channel may be air in which electromagnetic waves including the information are propagated. Processes for storing data into memory media (e.g., memory devices) and for reading out the data from the memory media may be performed through the channel.

When the data are transmitted through the channel, an error may be included in the data. Thus, a lot of effort has been continuously focused on developing devices and methods for detecting errors from erroneous data and for removing the detected errors to restore the erroneous data to their original data. An ECC encoding operation and an ECC decoding operation have been widely used in memory systems including the memory media. The ECC encoding operation may correspond to a process for generating transmission data by adding an error control code (or the error correction code) to original data (i.e., write data) before the original data are transmitted to perform a write operation. The ECC decoding operation may correspond to a process for performing a read operation to read out data stored in the memory media and for separating the read data into the original data and the added code to restore the read data to the original data.

SUMMARY

According to an embodiment, a memory system includes a host error correction code (ECC) encoder and a memory module. The host ECC encoder performs a host ECC encoding operation of write data to output host ECC encoded data. The memory module includes a memory medium receiving the host ECC encoded data and a module controller controlling the memory medium. The module controller includes a parity remover and a module ECC decoder. The parity remover removes parity data from the host ECC encoded data to generate parity-removed data and performs a first write operation for writing the parity-removed data into the memory medium. The module ECC decoder performs a module ECC decoding operation of the host ECC encoded data to generate module ECC decoded data and performs a second write operation for writing the module ECC decoded data into the memory medium.

According to another embodiment, a memory system includes a host error correction code (ECC) encoder and a memory module. The host ECC encoder performs a host ECC encoding operation of write data to output host ECC encoded data through at least one of data input/output (I/O) lines. The memory module includes a memory medium receiving the host ECC encoded data and a module controller controlling the memory medium. The module controller includes a data path determiner, a parity remover, a module ECC decoder and an error location counter. The data path determiner determines a processing path of the host ECC encoded data according to a normality/abnormality of the data I/O lines. The parity remover removes parity data from the host ECC encoded data outputted from the data path determiner to generate parity-removed data and performs a first write operation for writing the parity-removed data into the memory medium. The module ECC decoder performs a module ECC decoding operation of the host ECC encoded data outputted from the data path determiner to generate module ECC decoded data and performs a second write operation for writing the module ECC decoded data into the memory medium. The error location counter stores information on the data I/O lines.

According to yet another embodiment, there is provided a writing method of a memory system. The writing method includes performing an error correction code (ECC) encoding operation of write data to generate ECC encoded data, performing a first write operation for writing parity-removed data into a memory medium after parity data are removed from the ECC encoded data to generate the parity-removed data, and performing a second write operation for writing ECC decoded data into the memory medium after the ECC decoded data are generated by performing an ECC decoding operation of the ECC encoded data only when an error exists in the ECC encoded data.

According to still another embodiment, there is provided a writing method of a memory system. The writing method includes performing an error correction code (ECC) encoding operation of write data to generate ECC encoded data, discriminating whether a data input/output (I/O) line transmitting the ECC encoded data normally functions, performing a first write operation for writing parity-removed data into a memory medium after parity data are removed from the ECC encoded data to generate the parity-removed data when the data I/O line normally functions and a second write operation for writing ECC decoded data into the memory medium after the ECC decoded data are generated by performing an ECC decoding operation of the ECC encoded data only when an error exists in the ECC encoded data, and performing only the second write operation without execution of the first write operation when the data I/O line malfunctions.

BRIEF DESCRIPTION OF THE DRAWINGS

Certain features of the disclosed technology are illustrated by various embodiments with reference to the attached drawings, in which.

DETAILED DESCRIPTION

In the following description of the embodiments, it will be understood that the terms "first" and "second" are intended to identify an element, but not used to define only the element itself or to mean a particular sequence. In addition, when an element is referred to as being located "on", "over", "above", "under" or "beneath" another element, it is intended to mean relative position relationship, but not used to limit certain cases that the element directly contacts the other element, or at least one intervening element is present therebetween. Accordingly, the terms such as "on", "over", "above", "under", "beneath", "below" and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may form a connection relationship or coupling relationship by replacing the other element therebetween.

Each of memory devices may be provided in the form of a memory module to increase a memory capacity thereof. In general, the memory module may include a memory medium and a module controller. The memory module may receive data from a host and output the data to the host through a plurality of data input/output (I/O) lines. For example, write data outputted from the host may be transmitted to the module controller of the memory module and may be written into the memory medium by a control operation of the module controller. While the write data are transmitted from the host to the module controller of the memory module, errors of the write data may be generated. Thus, the host may perform an error correction code (ECC) encoding operation of the write data, and the module controller may perform an ECC decoding operation to correct the erroneous write data and to write the corrected write data into the memory medium. Commonly, while the write data are transmitted from the host to the module controller, the probability of error's occurring may be lower than the probability that no error occurs. Thus, in most cases, the ECC decoding operation may be unnecessarily performed in the module controller of the memory module. In memory systems according to the following embodiments, the execution of the ECC decoding operation may be omitted when no error occurs. Accordingly, it may be possible to improve a write operation speed for storing the write data into the memory medium. Various embodiments of the present disclosure will be described with reference to the accompanying drawings.

Figure 1:
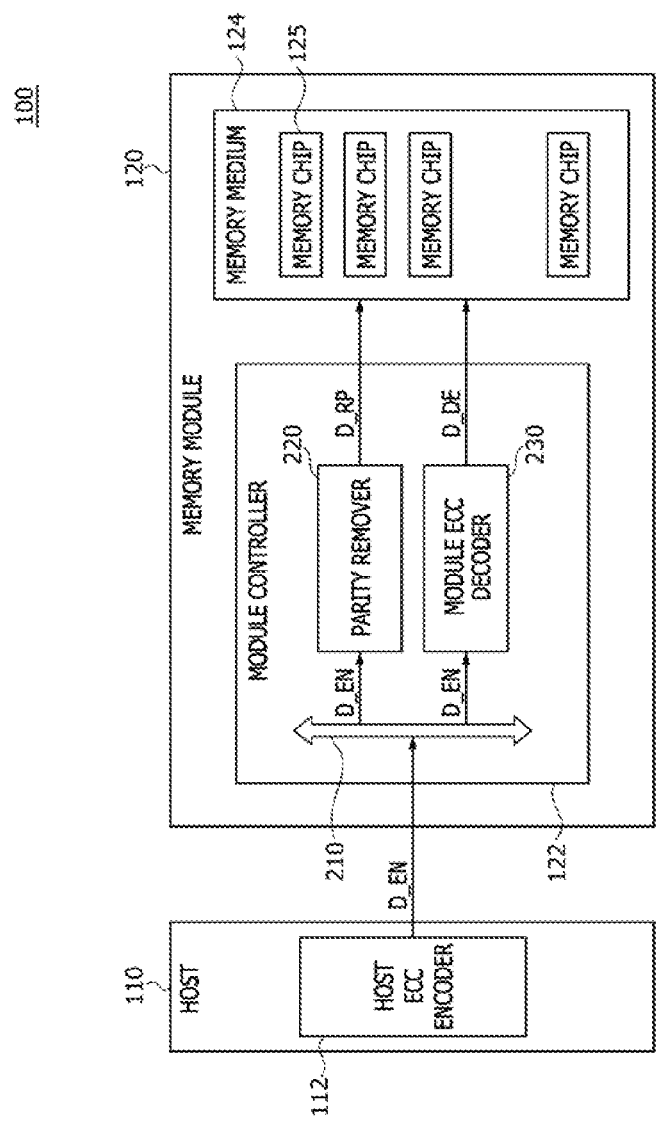
FIG. 1 is a block diagram illustrating a configuration of a memory system according to an embodiment of the present disclosure.

FIG. 1 is a block diagram illustrating a configuration of a memory system 100 according to an embodiment of the present disclosure. Referring to FIG. 1, the memory system 100 may be configured to include a host 110 and a memory module 120. Although not shown in FIG. 1, the host 110 and the memory module 120 may be coupled to each other by a module interface, and data may be transmitted through the module interface. The host 110 may provide various codes used to control the memory module 120, and the various codes may be stored into the memory module 120. The host 110 may access to the various codes stored in the memory module 120. The host 110 may store codes for executing an operating system and application programs or data relating to the operating system and the application programs into the memory module 120 and may access to the codes or the data stored in the memory module 120. The host 110 may include a host ECC encoder 112. In an embodiment, the host ECC encoder may be disposed in the host 110. The host ECC encoder 112 may perform a host ECC encoding operation of write data, which are transmitted from the host 110 to the memory module 120, to generate host ECC encoded data D_EN. The host ECC encoded data D_EN may be transmitted from the host 110 to the memory module 120. The host ECC encoded data D_EN may include parity data in addition to the write data. That is, the host ECC encoding operation may be defined as an operation calculating the parity data which are added to the write data.

The memory module 120 may be configured to include a module controller 122 and a memory medium 124. The memory medium 124 may include a plurality of memory chips 125. The module controller 122 may include a module controller bus 210, a parity remover 220 and a module ECC decoder 230. The module controller 122 may transmit the host ECC encoded data D_EN from the host ECC encoder 112 to the parity remover 220 and the module ECC decoder 230 through the module controller bus 210, In an embodiment, the parity remover 220 and the module ECC decoder 230 may simultaneously receive the host ECC encoded data D_EN, The words "simultaneous" and "simultaneously" as used herein with respect to receiving the host ECC encoded data D_EN by the parity remover 220 and the module ECC decoder 230 means that the reception takes place on overlapping intervals of time. For example, if a first reception takes place over a first interval of time and a second reception takes place simultaneously over a second interval of time, then the first and second intervals at least partially overlap each other such that there exists a time at which the first and second receptions are both taking place.

The parity remover 220 may remove the parity data from the host ECC encoded data D_EN transmitted through the module controller bus 210 and may then output parity-removed data D_RP generated by removing the parity data from the host ECC encoded data D_EN. As a result, the parity remover 220 may output original write data corresponding to the parity-removed data D_RP. The parity-removed data D_RP may be written into the memory medium 124. The parity-removed data D_RP may correspond to data generated by removing only the parity data from the host ECC encoded data D_EN. Thus, an error correction process is not applied to the parity-removed data D_RP yet. Instead, because only the parity data removal process is performed without execution of the error correction process, it may be possible to reduce a write time it takes the write data to be written into the memory medium 124. As will be described hereinafter, if the host ECC encoded data D_EN correspond to erroneous data, error-corrected data may be overwritten into the memory medium 124 in which the parity-removed data D_RP are stored. Hereinafter, an operation for generating the parity-removed data D_RP and for writing the parity-removed data D_RP into the memory medium 124 may be referred to as "a first write operation".

The module ECC decoder 230 may perform a module ECC decoding operation of the host ECC encoded data D_EN transmitted through the module controller bus 210. The module ECC decoder 230 may output module ECC decoded data D_DE or not according to a result of the module ECC decoding operation. Specifically, the module ECC decoder 230 may discriminate whether the host ECC encoded data D_EN are erroneous data during the module ECC decoding operation. If no error exists in the host ECC encoded data D_EN, the module ECC decoding operation may stop. Thus, in such a case, the module ECC decoder 230 might not output the module ECC decoded data D_DE. In contrast, if the host ECC encoded data D_EN correspond to erroneous data, the module ECC decoding operation may be completed and the module ECC decoded data D_DE may be outputted from the module ECC decoder 230. In an embodiment, the module ECC decoded data D_DE may be generated by correcting errors of the host ECC encoded data D_EN and by removing the parity data from the corrected data of the host ECC encoded data D_EN. The module ECC decoded data D_DE outputted from the module ECC decoder 230 may be written into the memory medium 124. Hereinafter, an operation for generating the module ECC decoded data D_DE and for writing the module ECC decoded data D_DE into the memory medium 124 may be referred to as "a second write operation".

Figure 2:
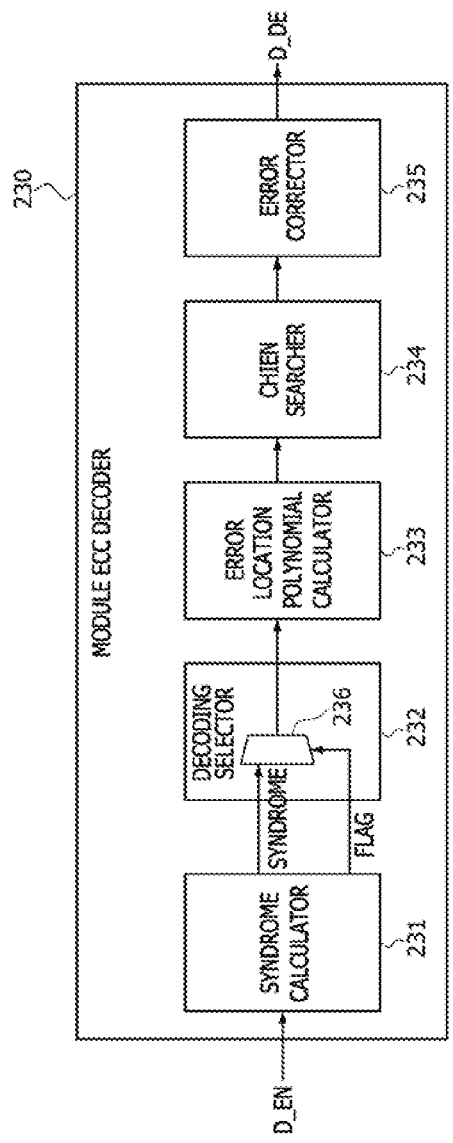
FIG. 2 is a block diagram illustrating a configuration of a module ECC decoder included in the memory system of FIG. 1.

FIG. 2 is a block diagram illustrating a configuration of the module ECC decoder 230 included in the memory system 100 of FIG. 1. The module ECC decoder 230 may output the module ECC decoded data D_DE or not according to whether the host ECC encoded data D_EN are erroneous data. Referring to FIG. 2, the module ECC decoder 230 may be configured to include a syndrome calculator 231, a decoding selector 232, an error location polynomial calculator 233, a Chien searcher 234 and an error corrector 235. The syndrome calculator 231 may perform a syndrome calculating operation of the host ECC encoded data D_EN to generate and output a syndrome to the decoding selector 232. The syndrome calculator 231 may output a flag signal FLAG to the decoding selector 232 according to the absence or presence of an error as a result of the syndrome calculation. In an embodiment, the decoding selector 232 may be configured to receive the syndrome and the flag signal to prevent output of a syndrome when an error is absent from the host ECC encoded data D_EN and to output the syndrome when the error exists in the host ECC encoded data D_EN. In an embodiment, the flag signal FLAG may have a one-bit binary number. For example, if all of bits included in the syndrome calculated by the syndrome calculator 231 have a logic "low(0)" level, it means that no error exists. In such a case, the syndrome calculator 231 may output the flag signal FLAG having a logic "low(0)" level to the decoding selector 232. In contrast, if all of bits included in the syndrome calculated by the syndrome calculator 231 do not have a logic "low(0)" level (i.e., at least one of bits included in the syndrome calculated by the syndrome calculator 231 has a logic "low(1)" level), it means that an error exists. In such a case, the syndrome calculator 231 may output the flag signal FLAG having a logic "high(1)" level to the decoding selector 232.

In an embodiment, the decoding selector 232 may be configured to include a multiplexer 236. The multiplexer 236 may have two input terminals, a control input terminal and an output terminal. The syndrome outputted from the syndrome calculator 231 may be inputted to one of the two input terminals of the multiplexer 236. The other one of the two input terminals of the multiplexer 236 may correspond to a null input terminal to which no data are inputted. The flag signal FLAG outputted from the syndrome calculator 231 may be inputted to the control input terminal of the multiplexer 236. If the flag signal FLAG has a logic "low (0)" level (i.e., no error exists), the output terminal of the multiplexer 236 may be coupled to the null input terminal. Thus, in such a case, no data are outputted through the output terminal of the multiplexer 236. In contrast, if the flag signal FLAG has a logic "high(1)" level (i.e., an error exists), the output terminal of the multiplexer 236 may be coupled to the input terminal to which the syndrome is inputted. Thus, in such a case, the syndrome calculated by the syndrome calculator 231 may be outputted through the output terminal of the multiplexer 236. In an embodiment, the null input terminal may have a null state.

The error location polynomial calculator 233 may perform a calculating operation of the syndrome to generate and output an error location polynomial if the syndrome is transmitted from the decoding selector 232 to the error location polynomial calculator 233. The error location polynomial calculated by the error location polynomial calculator 233 may be inputted to the Chien searcher 234. The Chien searcher 234 may calculate a solution of the error location polynomial outputted from the error location polynomial calculator 233 to find an error location. In an embodiment, while the solution of the error location polynomial is calculated by the Chien searcher 234, an error magnitude in addition to the error location may also be found. The error corrector 235 may correct an error using the error location obtained by the Chien searcher 234, thereby outputting the module ECC decoded data D_DE which are corrected.

Figure 3:
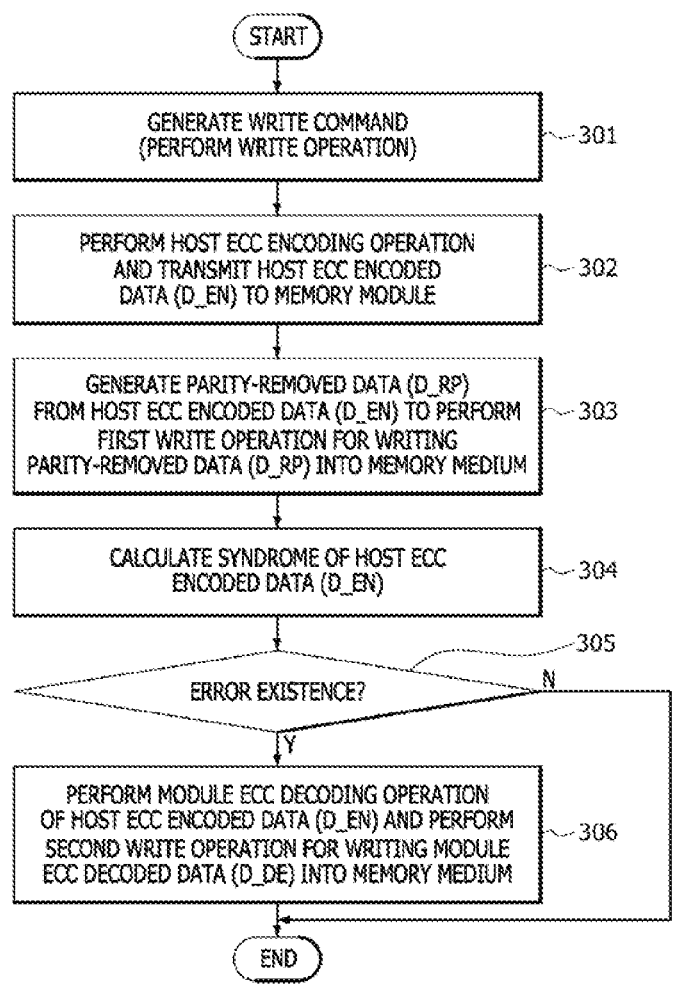
FIG. 3 is a flowchart illustrating a writing method of the memory system shown in FIG. 1.

FIG. 3 is a flowchart illustrating a writing method of the memory system 100 shown in FIG. 1. Referring to FIGS. 1 and 3, at a step 301, a write command may be generated to perform a write operation. The write operation means an operation for writing write data outputted from the host 110 into the memory medium 124 of the memory module 120. At a step 302, the host ECC encoder 112 of the host 110 may perform the host ECC encoding operation of the write data. As described with reference to FIG. 1, the host ECC encoded data D_EN including the parity data in addition to the write data may be generated by the host ECC encoding operation. The host 110 may transmit the host ECC encoded data D_EN to the memory module 120. The host ECC encoded data D_EN transmitted to the memory module 120 may be inputted to both of the parity remover 220 and the module ECC decoder 230 through the module controller bus 210.

At a step 303, the parity remover 220 may remove the parity data from the host ECC encoded data D_EN to generate the parity-removed data D_RP, and the first write operation may be performed to write the parity-removed data D_RP into the memory medium 124. At a step 304, the module ECC decoder 230 may calculate the syndrome of the host ECC encoded data D_EN. At a step 305, the module ECC decoder 230 may discriminate whether an error exists in the host ECC encoded data D_EN as a result of the syndrome calculation. If the host ECC encoded data D_EN are regarded as data without any error at the step 305, the module ECC decoder 230 may stop the module ECC decoding operation not to output the module ECC decoded data D_DE. That is, if no error exists in the host ECC encoded data D_EN as a result of the calculation of the syndrome, only the first write operation may be performed without the execution of the second write operation.

If an error exists in the host ECC encoded data D_EN as a result of the syndrome calculation at the step 305, the module ECC decoder 230 may perform the module ECC decoding operation of the host ECC encoded data D_EN to generate the module ECC decoded data D_DE and may perform the second write operation for writing the module ECC decoded data D_DE into the memory medium 124 (see a step 306). That is, if the host ECC encoded data D_EN are regarded as erroneous data as a result of the syndrome calculation, all of the first and second write operations may be performed. In such a case, the first and second write operations may be applied to the same memory region in the memory medium 124. That is, the data may be overwritten into the same memory region in the memory medium 124.

According to the memory system 100 described above, a speed of the write operation for writing the write data into the memory medium 124 may be degraded when both of the first and second write operations are performed. In contrast, when only the first write operation is performed, the write operation speed may be improved. Commonly, while the write data are transmitted from the host 110 to the memory module 120, the probability that no error occurs may be much higher than the probability of error's occurring, That is, a frequency that only the first write operation is performed may be much higher than a frequency that both of the first and second write operations are performed. This may lead to improvement of the write operation speed for the memory medium 124.

Figure 4:
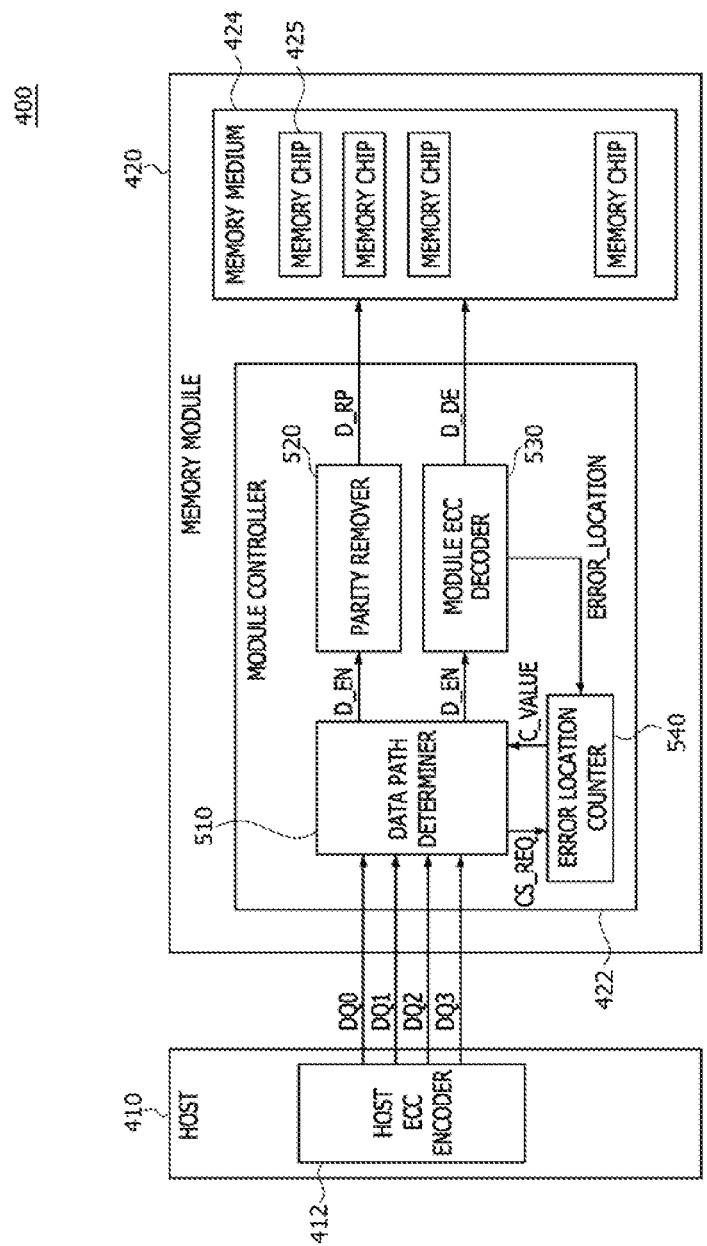
FIG. 4 is a block diagram illustrating a configuration of a memory system according to another embodiment of the present disclosure.

FIG. 4 is a block diagram illustrating a configuration of a memory system 400 according to another embodiment of the present disclosure. According to the memory system 400, the execution of the first write operation may be determined according to malfunction of data I/O lines. Referring to FIG. 4, the memory system 400 may be configured to include a host 410 and a memory module 420. The host 410 and the memory module 420 may be coupled to each other by a module interface, and data may be transmitted through the module interface. The module interface may include a plurality of data I/O lines, for example, first to fourth data I/O lines DQ0, DQ1, DQ2 and DQ3. The host 410 may provide various codes used to control the memory module 420, and the various codes may be stored into the memory module 420. The host 410 may access to the various codes stored in the memory module 420.

The host 410 may store codes for executing an operating system and application programs or data relating to the operating system and the application programs into the memory module 420 and may access to the codes or the data stored in the memory module 420. The host 410 may include a host ECC encoder 412. The host ECC encoder 412 may perform a host ECC encoding operation of write data, which are transmitted from the host 410 to the memory module 420, to generate host ECC encoded data D_EN. The host ECC encoded data D_EN may be transmitted from the host 410 to the memory module 420 through at least one of the first to fourth data I/O lines DQ0, DQ1, DQ2 and DQ3. In an embodiment, the host ECC encoded data D_EN may be transmitted from the host 410 to the memory module 420 through any one of the first to fourth data I/O lines DQ0, DQ1, DQ2 and DQ3. In another embodiment, the host ECC encoded data D_EN may be transmitted from the host 410 to the memory module 420 through all of the first to fourth data I/O lines DQ0, DQ1, DQ2 and DQ3. The host ECC encoded data D_EN may include parity data in addition to the write data. The following embodiments will be described hereinafter in conjunction with a case that the host ECC encoded data D_EN are transmitted from the host 410 to the memory module 420 through the fourth data I/O line DQ3.

The memory module 420 may be configured to include a module controller 422 and a memory medium 424. The memory medium 424 may include a plurality of memory chips 425. The module controller 422 may include a data path determiner 510, a parity remover 520, a module ECC decoder 530 and an error location counter 540. The data path determiner 510 may be coupled to the host ECC encoder 412 of the host 410 through the first to fourth data I/O lines DQ0, DQ1, DQ2 and DQ3. Thus, the data path determiner 510 may receive the host ECC encoded data D_EN from the host ECC encoder 412 of the host 410 through at least one of the first to fourth data I/O lines DQ0, DQ1, DQ2 and DQ3. In the present embodiment, the data path determiner 510 may receive the host ECC encoded data D_EN from the host ECC encoder 412 through the fourth data I/O line DQ3. The data path determiner 510 may change a transmission path of the host ECC encoded data D_EN according to malfunction of the fourth data I/O line DQ3.

Specifically, if the host ECC encoded data D_EN is inputted to the data path determiner 510, the data path determiner 510 may output a control signal CS_REQ for discriminating a normal and abnormal state of the fourth data I/O line DQ3 transmitting the host ECC encoded data D_EN to the error location counter 540. The data path determiner 510 may receive a count value C_VALUE from the error location counter 540 to discriminate whether the fourth data I/O line DQ3 transmitting the host ECC encoded data D_EN malfunctions. If the fourth data I/O line DQ3 is regarded as a malfunction line, the data path determiner 510 may transmit the host ECC encoded data D_EN only to the module ECC decoder 530 without transmitting to the parity remover 520. In contrast, if the fourth data I/O line DQ3 is regarded as a normal line, the data path determiner 510 may transmit the host ECC encoded data D_EN to both of the parity remover 520 and the module ECC decoder 530. In an embodiment, the data path determiner 510 may simultaneously transmit the host ECC encoded data D_EN outputted from the host ECC encoder 412 to both of the parity remover 520 and the module ECC decoder 530. The words "simultaneous" and "simultaneously" as used herein with respect to transmitting the host ECC encoded data D_EN to the parity remover 520 and the module ECC decoder 530 means that the transmission takes place on overlapping intervals of time. For example, if a first transmission takes place over a first interval of time and a second transmission takes place simultaneously over a second interval of time, then the first and second intervals at least partially overlap each other such that there exists a time at which the first and second transmissions are both taking place.

If the host ECC encoded data D_EN is inputted to the parity remover 520, the parity remover 520 may remove the parity data from the host ECC encoded data D_EN to generate and output parity-removed data D_RP. The parity-removed data D_RP outputted from the parity remover 520 may be written into the memory medium 424. That is, the first write operation may be performed.

The module ECC decoder 530 may perform a module ECC decoding operation of the host ECC encoded data D_EN to generate module ECC decoded data D_DE if the host ECC encoded data D_EN is inputted to the module ECC decoder 530. The module ECC decoder 530 may output the module ECC decoded data D_DE or not according to a result of the module ECC decoding operation.

Specifically, the module ECC decoder 530 may calculate the syndrome of the host ECC encoded data D_EN, as described with reference to FIG. 2. If no error exists in the host ECC encoded data D_EN as a result of the calculation of the syndrome, the module ECC decoding operation may stop. Thus, in such a case, the module ECC decoder 530 might not output the module ECC decoded data D_DE. In contrast, if the host ECC encoded data D_EN correspond to erroneous data, the module ECC decoding operation may be completed and the module ECC decoded data DDE may be outputted from the module ECC decoder 530. The module ECC decoded data D_DE outputted from the module ECC decoder 530 may be written into the memory medium 424. That is, the second write operation may be performed. If an error exists in the host ECC encoded data D_EN, the module ECC decoder 530 may generate an error location and may output the error location to the error location counter 540.

The error location counter 540 may receive the error location from the module ECC decoder 530 and may count the count value C_VALUE of the fourth data I/O line DQ3 corresponding to the error location. The error location counter 540 may output the count value C_VALUE of the fourth data I/O line DQ3 to the data path determiner 510 in response to the control signal CS_REQ outputted from the data path determiner 510. The counting operation of the error location counter 540 may be performed whenever the error location is inputted to the error location counter 540 from the module ECC decoder 530. Thus, the count value C_VALUE of each of the first to fourth data I/O lines DQ0, DQ1, DQ2 and DQ3 may be equal to the number of times that an error of the data transmitted through the corresponding data I/O line is generated.

According to the memory system 400 described above, if the data I/O line transmitting the host ECC encoded data D_EN functions normally, only the first write operation may be performed or both of the first and second write operations may be performed. That is, in such a case, only the first write operation may be performed if no error exists in the host ECC encoded data D_EN, and both of the first and second write operations may be performed if an error exists in the host ECC encoded data D_EN. If the host ECC encoded data D_EN are transmitted through the abnormal data I/O line among the first to fourth data I/O lines DQ0, DQ1, DQ2 and DQ3, an error may be always generated during the transmission of the host ECC encoded data D_EN due to the malfunction of the abnormal data I/O line. Thus, in such a case, the second write operation may always be performed, and there is no need to perform the first writ operation. Accordingly, if the data I/O line through which the host ECC encoded data D_EN are transmitted malfunctions in the memory system 400, only the second write operation may be performed without the execution of the first write operation.

Figure 5:
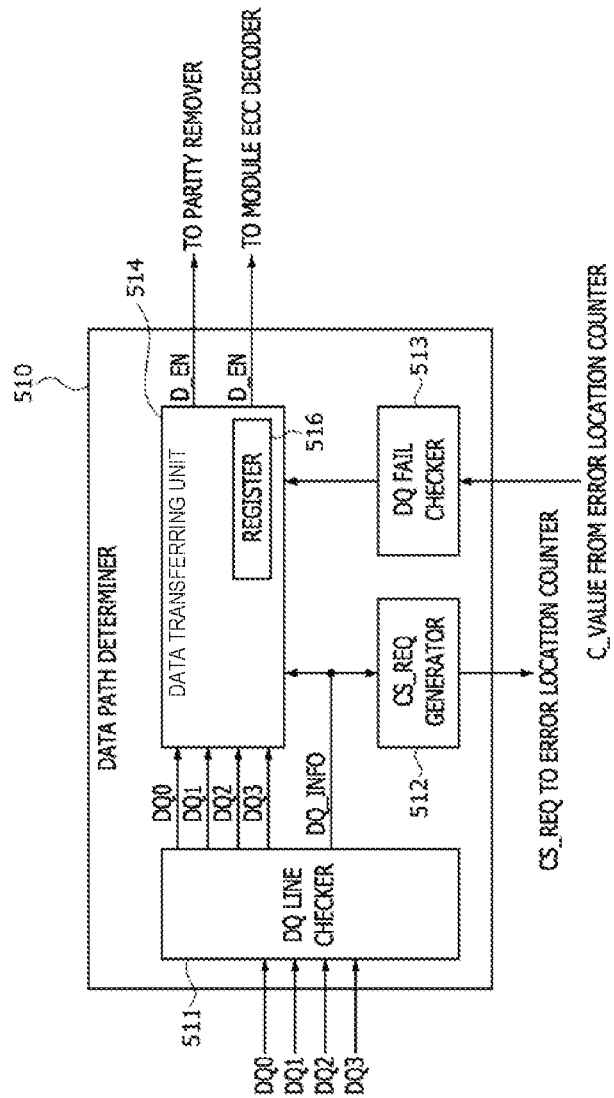
FIG. 5 is a block diagram illustrating a configuration of a data path determiner included in the memory system of FIG. 4.
Figure 6:
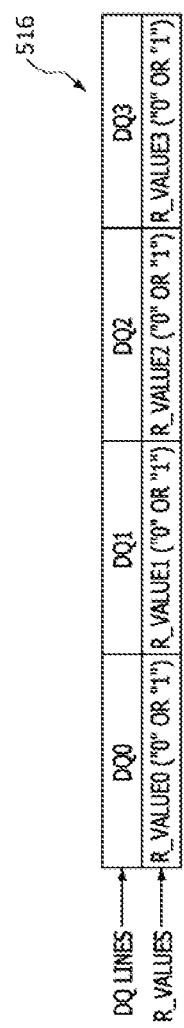
FIG. 6 is a schematic view illustrating a configuration of a register included in the data path determiner of FIG. 5.

FIG. 5 is a block diagram illustrating a configuration of the data path determiner 510 included in the memory system 400 of FIG. 4, and FIG. 6 is a schematic view illustrating a configuration of a register 516 included in the data path determiner 510 of FIG. 5. Referring to FIG. 5, the data path determiner 510 may be configured to include a data I/O line checker 511, a control signal generator 512, a data I/O line fail checker 513 and a data transferring unit 514.

The data I/O line checker 511 may receive the host ECC encoded data D_EN from the host ECC encoder (412 of FIG. 4) through at least one (e.g., the fourth data I/O line DQ3) of the first to fourth data I/O lines DQ0, DQ1, DQ2 and DQ3. The data I/O line checker 511 may output data I/O line information DQ_INFO designating the data I/O line (i.e., the fourth data I/O line DQ3) through which the host ECC encoded data D_EN are transmitted. The data I/O line information DQ_INFO may be inputted to both of the control signal generator 512 and the data transferring unit 514. In addition, the data I/O line checker 511 may output the host ECC encoded data D_EN to the data transferring unit 514.

The control signal generator 512 may transmit the control signal CS_REQ to the error location counter (540 of FIG. 4) in response to the data I/O line information DQ_INFO outputted from the data I/O line checker 511. In an embodiment, the control signal CS_REQ may include an index signal designating the fourth data I/O line DQ3 through which the host ECC encoded data D_EN are transmitted as well as a signal requesting the count value C_VALUE from the error location counter 540.

The data I/O line fail checker 513 may receive the count value C_VALUE from the error location counter 540 to discriminate whether the fourth data I/O line DQ3 normally functions or malfunctions. In order to discriminate a normality/abnormality of the fourth data I/O line DQ3, the data I/O line fail checker 513 may include a comparison logic circuit. In an embodiment, the comparison logic circuit may compare the count value C_VALUE outputted from the error location counter 540 with a reference value to output a signal corresponding to the comparison result to the data transferring unit 514. The reference value may be set as the error occurrence number of times that the data I/O line can be regarded as an abnormal data I/O line malfunctioning. The data I/O line fail checker 513 may output a binary number having a logic "low(0)" level or a logic "high(1)" level as the comparison result signal. In an embodiment, if the count value C_VALUE is less than the reference value (i.e., the fourth data I/O line DQ3 normally functions), the data I/O line fail checker 513 may output the comparison result signal having a logic "low(0)" level. In contrast, if the count value C_VALUE is greater than the reference value (i.e., the fourth data I/O line DQ3 malfunctions), the data I/O line fail checker 513 may output the comparison result signal having a logic "high(1)" level.

The data transferring unit 514 may store information on a normality/abnormality of the data I/O line according to the discrimination of the data I/O line fail checker 513. The data transferring unit 514 may include the register 516 for storing data (i.e., the comparison result signal of the data I/O line fail checker 513) outputted from the data I/O line fail checker 513. As illustrated in FIG. 6, the register 516 may store register values R_VALUES (corresponding to the comparison result signal of the data I/O line fail checker 513) of the data I/O lines (DQ0, DQ1, DQ2 and DQ3). For example, a first register value R_VALUE0 having a logic "low(0)" or "high(1)" level for the first data I/O line DQ0 may be stored into the register 516. Similarly, second to fourth register values R_VALUE1, R_VALUE2 and R_VALUE3 having a logic "low(0)" or "high(1)" level for the second to fourth data I/O lines DQ1, DQ2 and DQ3 may be stored into the register 516.

The data transferring unit 514 may determine a processing path of the host ECC encoded data D_EN according to the register value stored in the register 516. If the fourth register value R_VALUE3 of the fourth data I/O line DQ3 through which the host ECC encoded data D_EN are transmitted has a logic "low(0)" level (i.e., the fourth data I/O line DQ3 functions normally), the data transferring unit 514 may output the host ECC encoded data D_EN to both of the parity remover (520 of FIG. 4) and the module ECC decoder (530 of FIG. 4). In contrast, if the fourth register value R_VALUE3 of the fourth data I/O line DQ3 through which the host ECC encoded data D_EN are transmitted has a logic "high(1)" level (i.e., the fourth data I/O line DQ3 malfunctions), the data transferring unit 514 may transmit the host ECC encoded data D_EN only to the module ECC decoder 530 without transmitting to the parity remover 520.

Figure 7:
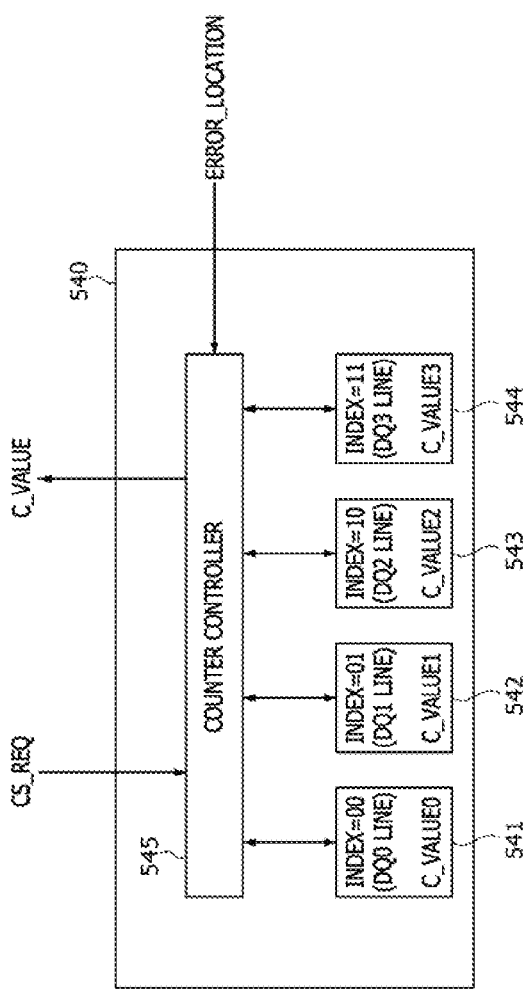
FIG. 7 is a block diagram illustrating a configuration of an error location counter included in the memory system of FIG. 4.

FIG. 7 is a block diagram illustrating a configuration of the error location counter 540 included in the memory system 400 of FIG. 4. Referring to FIG. 7, the error location counter 540 may be configured to include a plurality of counters (e.g., first to fourth counters 541~544) and a counter controller 545. In an embodiment, the number of the counters 541~544 may be equal to the number of the data I/O lines DQ0~DQ3. The counters 541~544 may be distinguished from each other by their own indexes. In an embodiment, the first to fourth counters 541~544 may have indexes of "00", "01", "10" and "11", respectively. The indexes of the first to fourth counters 541~544 may correspond to the first to fourth data I/O lines DQ0, DQ1, DQ2 and DQ3, respectively. Thus, the first counter 541 may perform a counting operation for the first data I/O line DQ0 to generate and store a first count value C_VALUE0. The second counter 542 may perform a counting operation for the second data I/O line DQ1 to generate and store a second count value C_VALUE1. The third counter 543 may perform a counting operation for the third data I/O line DQ2 to generate and store a third count value C_VALUE2. The fourth counter 544 may perform a counting operation for the fourth data I/O line DQ3 to generate and store a fourth count value C_VALUE3.

The counter controller 545 may output a count value C_VALUE of the designated counter among the first to fourth counters 541~544 in response to the control signal CS_REQ outputted from the data path determiner 510. Designation of the counter may be achieved by the index included in the control signal CS_REQ. The counter controller 545 may receive information on the error location ERROR_LOCATION from the module ECC decoder 530 of FIG. 4). The counter controller 545 may control the counters 541~544 such that the counter of the data I/O line corresponding to the error location ERROR_LOCATION performs a counting operation. For example, if the error location ERROR_LOCATION corresponds to the fourth data I/O line DQ3, the fourth counter 544 corresponding to the fourth data I/O line DQ3 may perform a counting operation.

Figure 8:
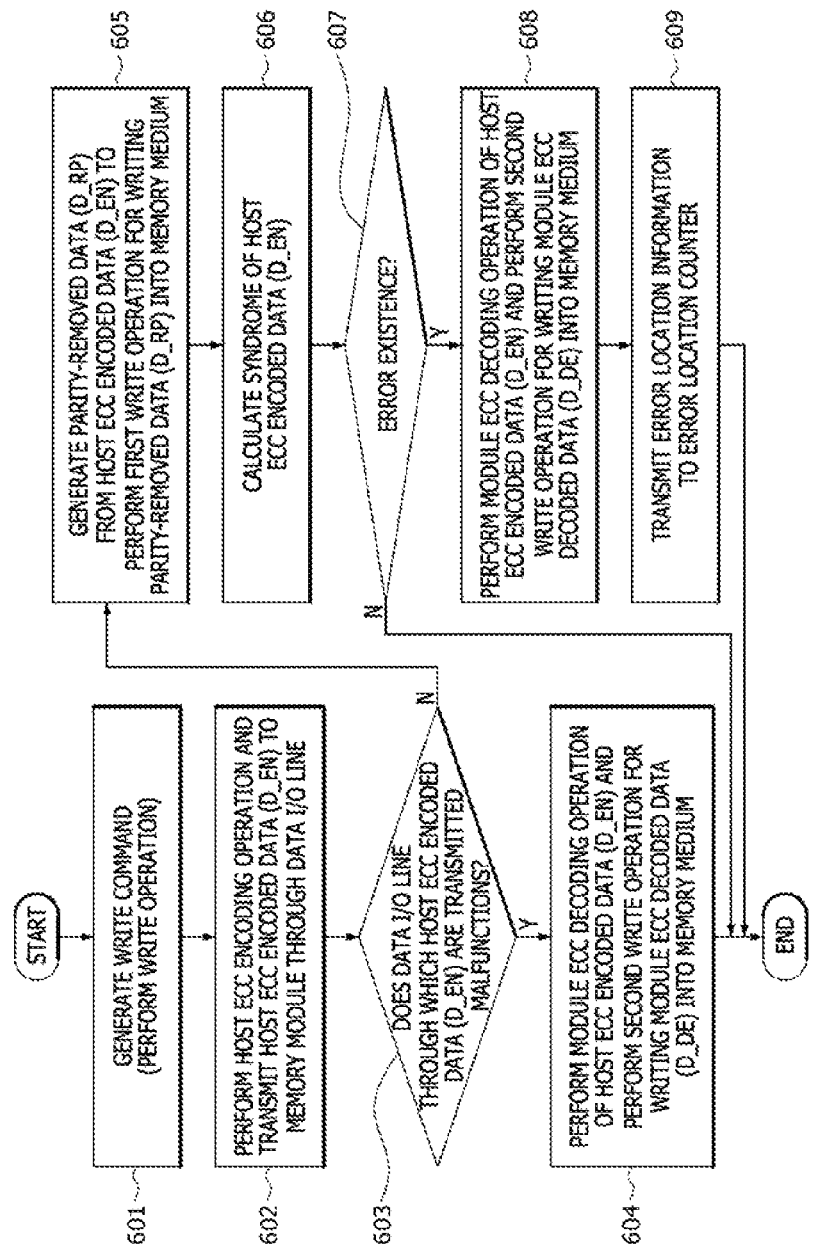
FIG. 8 is a flowchart illustrating a writing method of the memory system shown in FIG. 4.

FIG. 8 is a flowchart illustrating a writing method of the memory system 400 shown in FIG. 4. Referring to FIGS. 4 and 8, at a step 601, the write command may be generated to perform the write operation. The write operation means an operation for writing the write data outputted from the host 410 into the memory medium 424 of the memory module 420. At a step 602, the host ECC encoder 412 of the host 410 may perform the host ECC encoding operation of the write data. As described with reference to FIG. 4, the host ECC encoded data D_EN including the parity data in addition to the write data may be generated by the host ECC encoding operation. The host 410 may transmit the host ECC encoded data D_EN to the memory module 420.

At a step 603, whether the data I/O line transmitting the host ECC encoded data D_EN normally functions or malfunctions may be discriminated. In order to discriminate a normality/abnormality of the data I/O line, the data path determiner 510 accesses to the register value R_VALUE stored in the register (516 of FIGS. 5 and 6) included in the data path determiner 510. As described with reference to FIG. 6, the register value R_VALUE may be a binary number indicating whether the corresponding data I/O line normally functions or malfunctions. That is, the data path determiner 510 may access to the register value R_VALUE stored in the register 516 to discriminate whether the data I/O line transmitting the host ECC encoded data D_EN normally functions or malfunctions.

If the data I/O line transmitting the host ECC encoded data D_EN is regarded as an abnormal line that malfunctions at the step 603, the module ECC decoding operation of the host ECC encoded data D_EN may be performed to generate the module ECC decoded data D_DE and the second write operation may be performed to write the module ECC decoded data D_DE into the memory medium 424 (see a step 604). In such a case, the data path determiner 510 may transmit the host ECC encoded data D_EN only to the module ECC decoder 530 without transmitting the host ECC encoded data D_EN to the parity remover 520. If the data I/O line transmitting the host ECC encoded data D_EN malfunctions, the host ECC encoded data D_EN may include an error due to the malfunction of the data I/O line. Thus, in such a case, it may be unnecessary to perform the first write operation because the second write operation is always performed.

If the data I/O line transmitting the host ECC encoded data D_EN is regarded as a normal line that normally functions at the step 603, the parity remover 520 may remove the parity data from the host ECC encoded data D_EN to generate the parity-removed data D_RP and may perform the first writ operation to write the parity-removed data D_RP into the memory medium 424 (see a step 605). At a step 606, the module ECC decoder 530 may calculate the syndrome of the host ECC encoded data D_EN. At a step 607, the module ECC decoder 530 may discriminate whether an error exists in the host ECC encoded data D_EN as a result of the syndrome calculation. If the host ECC encoded data D_EN are regarded as data without any error at the step 607, the module ECC decoder 530 may stop the module ECC decoding operation not to output the module ECC decoded data D_DE. That is, if no error exists in the host ECC encoded data D_EN as a result of the calculation of the syndrome, only the first write operation may be performed without the execution of the second write operation.

If an error exists in the host ECC encoded data D_EN at the step 607, the module ECC decoder 530 may perform the module ECC decoding operation of the host ECC encoded data D_EN to generate the module ECC decoded data D_DE and may perform the second write operation for writing the module ECC decoded data D_DE into the memory medium 424 (see a step 608). That is, if the host ECC encoded data D_EN are regarded as erroneous data as a result of the syndrome calculation, all of the first and second write operations may be performed. In such a case, the first and second write operations may be applied to the same memory region in the memory medium 424. That is, the data may be overwritten into the same memory region in the memory medium 424.

At a step 609, the module ECC decoder 530 may transmit information on the error location to the error location counter 540. The error location counter 540 may control the counters 541~544 such that the counter of the data I/O line corresponding to the error location ERROR_LOCATION performs a counting operation to generate the count value C_VALUE. The count value C_VALUE of the error location counter 540 may be inputted to the data path determiner 510 by the control signal CS_REQ outputted from the data path determiner 510.

The embodiments of the disclosed technology have been disclosed above for illustrative purposes. Those of ordinary skill in the art will appreciate that various modifications, additions, and substitutions are possible. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A memory system comprising:
a host error correction code (ECC) encoder configured to perform a host ECC encoding operation on write data to output host ECC encoded data; and
a memory module including a memory medium and a module controller, the memory module configured to receive the host ECC encoded data and the module controller configured to control the memory medium,
wherein the module controller includes:
a parity remover configured to remove parity data from the host ECC encoded data to generate parity-removed data and configured to perform a first write operation for writing the parity-removed data into the memory medium; and
a module ECC decoder configured to perform a module ECC decoding operation of the host ECC encoded data to generate module ECC decoded data and configured to perform a second write operation for writing the module ECC decoded data into the memory medium.

2. The memory system of claim 1, wherein the host ECC encoder is disposed in a host.

3. The memory system of claim 1, wherein the host ECC encoded data includes the write data and the parity data.

4. The memory system of claim 1, wherein the first and second write operations are applied to the same region included in the memory medium.

5. The memory system of claim 1, wherein the module controller transmits the host ECC encoded data outputted from the host ECC encoder to both of the parity remover and the module ECC decoder.

6. The memory system of claim 1, wherein the module ECC decoder does not perform the second write operation when no error exists in the host ECC encoded data.

7. The memory system of claim 1, wherein the module ECC decoder includes:
a syndrome calculator configured to perform a syndrome calculating operation of the host ECC encoded data to generate a syndrome and configured to output the syndrome and a flag signal indicating at least one of a presence and absence of an error in the host ECC encoded data;
a decoding selector configured to receive the syndrome and the flag signal to prevent output of a syndrome when an error is absent from the host ECC encoded data and to output the syndrome when the error exists in the host ECC encoded data; and
an error corrector configured to receive the syndrome from the decoding selector to correct the error.

8. The memory system of claim 7, wherein the decoding selector includes a first input terminal receiving the syndrome, a second input terminal having a null state, and a control input terminal receiving the flag signal.

9. A memory system comprising:
a host error correction code (ECC) encoder configured to perform a host ECC encoding operation on write data to output host ECC encoded data through at least one of data input and output (I/O) lines; and
a memory module including a memory medium and a module controller, the memory module configured to receive the host ECC encoded data and the module controller configured to control the memory medium,
wherein the module controller includes:
a data path determiner configured to determine a processing path of the host ECC encoded data according to a normality and abnormality of the data I/O lines;
a parity remover configured to remove parity data from the host ECC encoded data outputted from the data path determiner to generate parity-removed data and configured to perform a first write operation for writing the parity-removed data into the memory medium;
a module ECC decoder configured to perform a module ECC decoding operation on the host ECC encoded data outputted from the data path determiner to generate module ECC decoded data and configured to perform a second write operation for writing the module ECC decoded data into the memory medium; and
an error location counter configured to store information on the data I/O lines.

10. The memory system of claim 9, wherein the host ECC encoder is disposed in a host.

11. The memory system of claim 9, wherein the host ECC encoded data includes the write data and the parity data.

12. The memory system of claim 9, wherein the first and second write operations are applied to the same region included in the memory medium.

13. The memory system of claim 9, wherein the data path determiner is configured to receive a count value from the error location counter to discriminate whether the data I/O lines malfunction, configured to store the discrimination results corresponding to abnormal or normal data I/O lines, and configured to determine the processing path of the host ECC encoded data according to the discrimination results for the abnormal or normal data I/O lines.

14. The memory system of claim 13, wherein the data path determiner transmits the host ECC encoded data to the module ECC decoder without transmitting the host ECC encoded data to the parity remover when any one of the data I/O lines used to transmit the host ECC encoded data from the host ECC encoder to the data path determiner malfunctions.

15. The memory system of claim 9, wherein the data path determiner includes:
a data I/O line checker configured to output the host ECC encoded data and data I/O line information designating at least one of the data I/O lines through which the host ECC encoded data are transmitted;
a control signal generator configured to receive the data I/O line information to generate a control signal requesting a count value from the error location counter;
a data I/O line fail checker configured to receive the count value from the error location counter to discriminate whether the data I/O lines normally functions; and
a data transferring unit configured to store information on a normality and abnormality of the data I/O lines according to the discrimination of the data I/O line fail checker and configured to determine the processing path of the host ECC encoded data according to the information on a normality and abnormality of the data I/O lines.

16. The memory system of claim 15, wherein the data transferring unit transmits the host ECC encoded data outputted from the data I/O line fail checker to the module ECC decoder without transmitting the host ECC encoded data to the parity remover when any one of the data I/O lines malfunctions.

17. The memory system of claim 9, wherein the data path determiner transmits the host ECC encoded data outputted from the host ECC encoder to both of the parity remover and the module ECC decoder.

18. The memory system of claim 9, wherein the module ECC decoder is prevented from performing the second write operation when an error is absent from the host ECC encoded data.

19. The memory system of claim 9, wherein the module ECC decoder includes:
   a syndrome calculator configured to perform a syndrome calculating operation of the host ECC encoded data to generate a syndrome and configured to output the syndrome and a flag signal indicating at least one of a presence and absence of an error in the host ECC encoded data;
   a decoding selector configured to receive the syndrome and the flag signal to prevent output of a syndrome when an error is absent from the host ECC encoded data and to output the syndrome when the error exists in the host ECC encoded data; and
   an error corrector configured to receive the syndrome from the decoding selector to correct the error.

20. The memory system of claim 19, wherein the decoding selector includes a first input terminal receiving the syndrome, a second input terminal having a null state, and a control input terminal receiving the flag signal.

21. The memory system of claim 9, wherein the module ECC decoder outputs an error location and an index designating at least one of the data I/O lines to the error location counter when an error exists as a result of the module ECC decoding operation.

* * * * *